United States Patent [19]
Reinke et al.

[11] Patent Number: 5,345,065
[45] Date of Patent: Sep. 6, 1994

[54] INDUCTOR WITH VARIABLE ACTIVE LENGTH

[75] Inventors: Friedhelm Reinke; Jürgen Leisner; Waldemar Gezarzick, all of Remscheid, Fed. Rep. of Germany

[73] Assignee: AEG-Elothern GmbH, Remschied-Hasten, Fed. Rep. of Germany

[21] Appl. No.: 103,891

[22] Filed: Aug. 6, 1993

[30] Foreign Application Priority Data

Sep. 1, 1992 [DE] Fed. Rep. of Germany ....... 4229117
Sep. 16, 1992 [DE] Fed. Rep. of Germany ....... 4230897

[51] Int. Cl.⁵ .............................................. H05B 6/40
[52] U.S. Cl. ..................................... 219/672; 219/673
[58] Field of Search ............... 219/10.79, 10.75, 10.71, 219/10.43, 672, 673, 676, 671; 266/129

[56] References Cited

U.S. PATENT DOCUMENTS

| | | | |
|---|---|---|---|
| 3,431,382 | 3/1969 | Esche et al. | 219/10.79 |
| 3,446,930 | 5/1969 | Seulen et al. | 219/10.79 |
| 3,649,798 | 3/1972 | Seyfried et al. | 219/10.79 |
| 3,824,367 | 7/1974 | Balzer et al. | 219/10.79 |
| 3,842,234 | 10/1974 | Seyfried | 219/10.79 |
| 4,258,241 | 3/1981 | Soworowski | 219/10.71 |
| 4,694,134 | 9/1987 | Ross | 219/10.79 |
| 5,173,246 | 12/1992 | Schwarz et al. | 266/129 |

FOREIGN PATENT DOCUMENTS

| | | |
|---|---|---|
| 1198949 | 8/1965 | Fed. Rep. of Germany . |
| 1963368 | 6/1971 | Fed. Rep. of Germany . |
| 3843457 | 7/1989 | Fed. Rep. of Germany . |
| 3929145 | 4/1991 | Fed. Rep. of Germany . |
| 4021025 | 9/1991 | Fed. Rep. of Germany . |
| 4103890 | 11/1991 | Fed. Rep. of Germany . |

Primary Examiner—Philip H. Leung
Attorney, Agent, or Firm—Meltzer, Lippe, Goldstein, Wolf, Schlissel & Sazer

[57] ABSTRACT

The invention relates to an inductor having two parallel main heating conductors which are interconnected at one of their ends via a bridge-shaped branch and are connected at their other end to a transformer, the connections also forming a bridge-shaped conductor branch. The characterizing feature of the invention is that disposed at least at one end of the parallel main heating conductors is a separate auxiliary inductor which is mounted displaceably in relation thereto and has two conductor portions parallel with the main heating conductors and inductively coupled thereto which are collectively interconnected at one of their axial ends via a bridge-shaped conductor branch determining the end of the heating zone and at the other end via a tunnel-shaped return conductor which over the whole displacement length is disposed beneath the bridge-shaped branch of the main heating conductors and is inductively coupled thereto.

2 Claims, 3 Drawing Sheets

INDUCTOR WITH VARIABLE ACTIVE LENGTH

The invention relates to an inductor of variable active length having two parallel main heating conductors which are interconnected at one of their ends via a bridge-shaped branch and are connected at their other end to a transformer, the connections also forming a bridge-shaped conductor branch.

An inductor of the kind specified is known from DE 39 29 145 C1. In that prior art construction the length of the inductor is adapted to varying workpiece lengths by telescoping the main heating conductors. The variable active length enables, for example, cardan shafts of different lengths, but otherwise identical dimensions, to be heated excessively in any sequence for edge layer hardening. In an inductor having the features of the preamble of the claim and set forth in DE 38 43 457 C2 when the effective inductor length is shortened, a heating conductor projects beyond each end of the workpiece on diametrically opposite sides. The result is an undesirable heating of the dead centres between which the workpiece is rotatably clamped. Two adaptation transformers are also needed.

In another known type of inductor having the features set forth in the preamble of the claim, to change the effective heating length the heating conductors are divided in the middle and can be changed by changing the degree of overlapping of the heating conductor portions in length for adaptation to the particular workpiece length. It is true that this type of inductor has the advantage over the previously mentioned one that only one transformer must be provided. A resulting disadvantage, however, is contacting, where dirt and scaling in the overlapping zone cause difficulties. As in the case of the first-mentioned prior art inductor, in the prior art inductor construction disclosed in DE 40 21 025 C1 two heating conductor loops are provided which are each applied from a transformer and whose effective overall length can be changed by the relative displacement of the two inductors in relation to one another. However, in this case also there is the problem that in certain positions the inductor projects beyond the workpiece ends and produces an undesirable heating of the dead centres.

It is an object of the invention so to improve an inductor having the features set forth in the preamble to the claim that as in a prior art construction already mentioned, only one alternating voltage source is required, but the aforementioned contact problems do not occur, and there is no heating of members disposed outside the workpiece, such as the dead centres of other machine parts, in which the workpieces to be heated are rotatably mounted. Another object is to provide a compact constructional unit.

To solve this problem, in the inductor having the features set forth hereinbefore, according to the invention disposed at least at one end of the parallel main heating conductors is a separate auxiliary inductor which is mounted displaceably in relation thereto and has two conductor portions parallel with the main heating conductors and inductively coupled thereto which are collectively interconnected at one of their axial ends via a bridge-shaped conductor branch determining the end of the heating zone and at the other end via a tunnel-shaped return conductor which over the whole displacement length is disposed beneath the bridge-shaped branch of the main heating conductors and is inductively coupled thereto.

The use of short circuit rings for the screening of magnetic fields is of course known in principle, but not for the solution of the problem stated (DE 41 03 890 A1).

The inductor according to the invention solves the problem stated. Only one transformer is required to supply current to the main and auxiliary heating conductors. Moreover, there are no contacting problems, since the auxiliary inductor is coupled not conductively, but inductively to the main heating conductor. Parts disposed outside the workpiece to be heated do not become heated, since the currents flow in opposite directions in the closely adjoining overlapping conductor portions beyond the end of the workpiece to be heated. Opposite currents also flow in the bridges, so that no undesirable heating of the dead centres can take place.

Preferably the main heating conductors are equipped with L-shaped magnet plates known per se, for example, from DE AS 1 198 949.

An embodiment of the invention will now be described in greater detail with reference to the drawings wherein.

Figure 1:
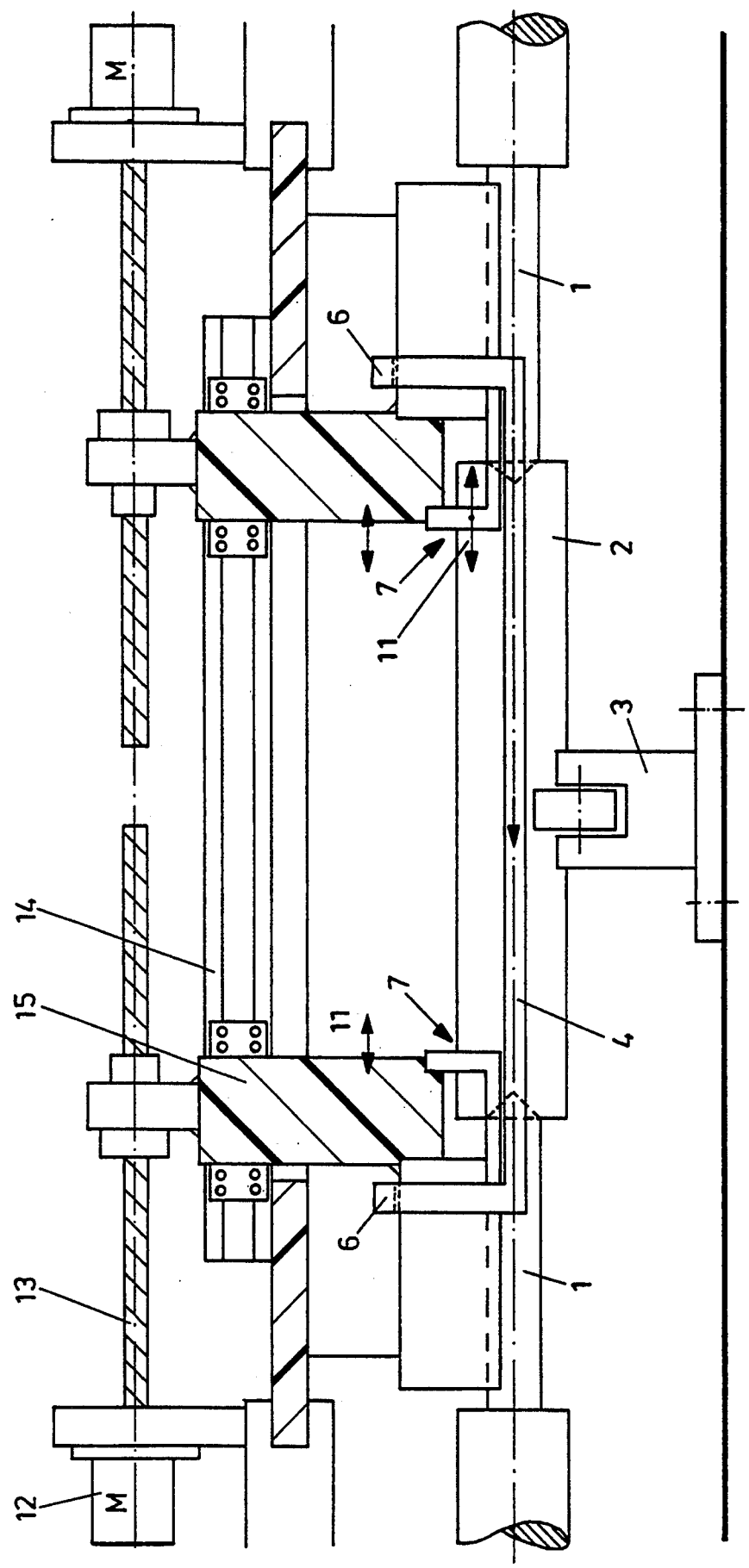
FIG. 1 is a side elevation of the inductor arrangement.
Figure 3:
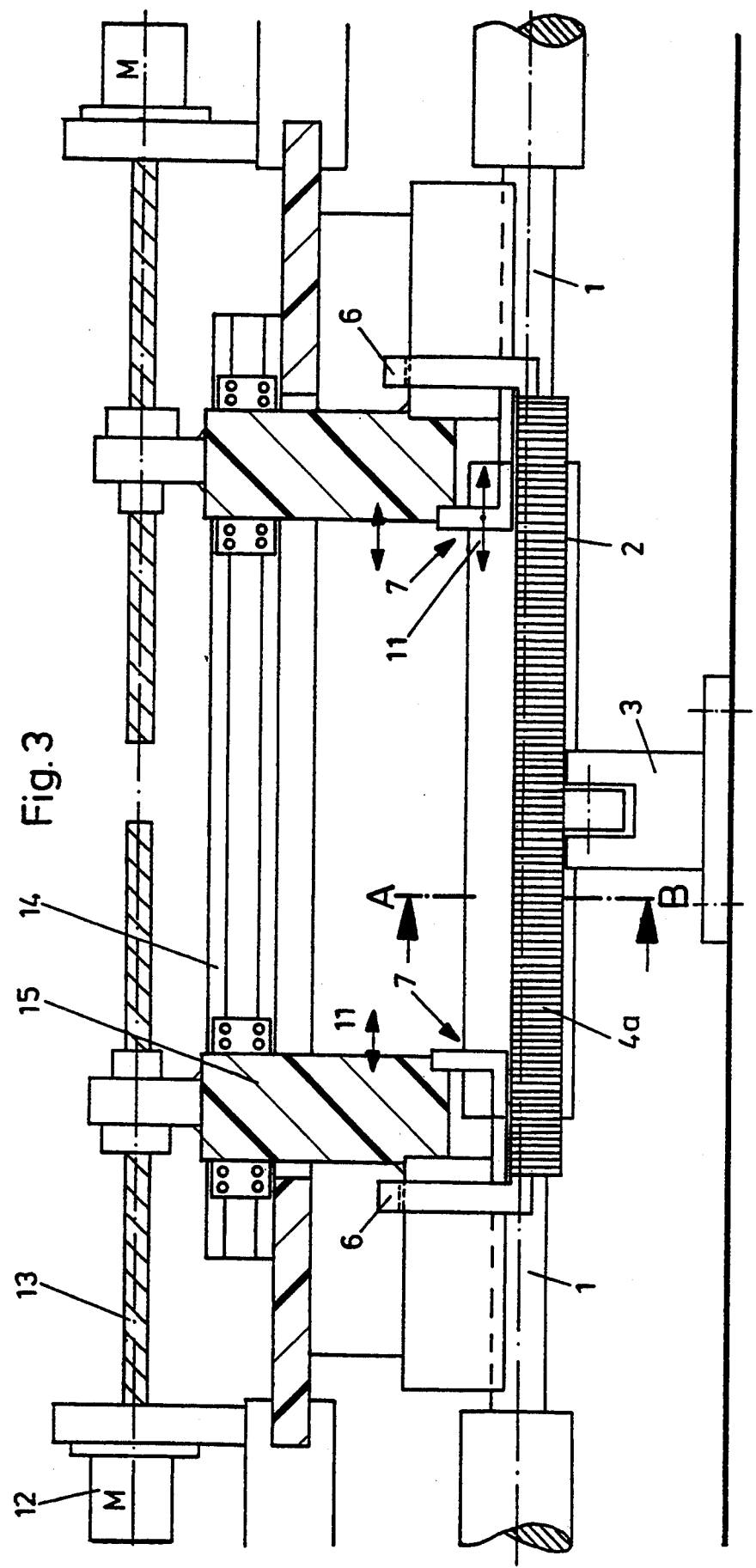

FIG. 3 corresponds to FIG. 1, and

Figure 4:
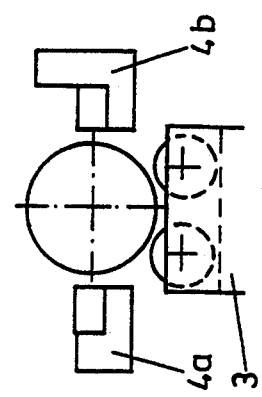

FIG. 4 is a partial cross-section, taken along the line A-B in FIG. 3.

Clamped between dead centres 1 of a rotation station is a workpiece 2 to be heated which is supported in the middle by a pair of rollers 3 to prevent the workpiece from being bent out of shape. Disposed on each of the diametrically opposite sides of the workpiece 2 is a main heating conductor 4. The main heating conductors 4 are disposed parallel with one another and at a distance parallel with a generatrix of the workpiece 2. Current flows through the heating conductors in opposite directions, as indicated by arrows in FIG. 2. The main heating conductors 4 are connected to a single transformer 5. At their axial ends they are conductively interconnected via bridge-shaped conductor branches 6, either via the secondary winding of the adaptation transformer or directly at the other end.

To allow adaptation to different axial lengths of workpieces 2 to be heated, in the embodiment illustrated in FIG. 1 two auxiliary inductors 7 are provided, one of which is disposed at each of the opposite axial ends of the main heating conductors 4. However, in certain circumstances either one auxiliary inductor would be enough if the axial lengths of the workpieces 2 do not differ too much from one another.

Figure 2:
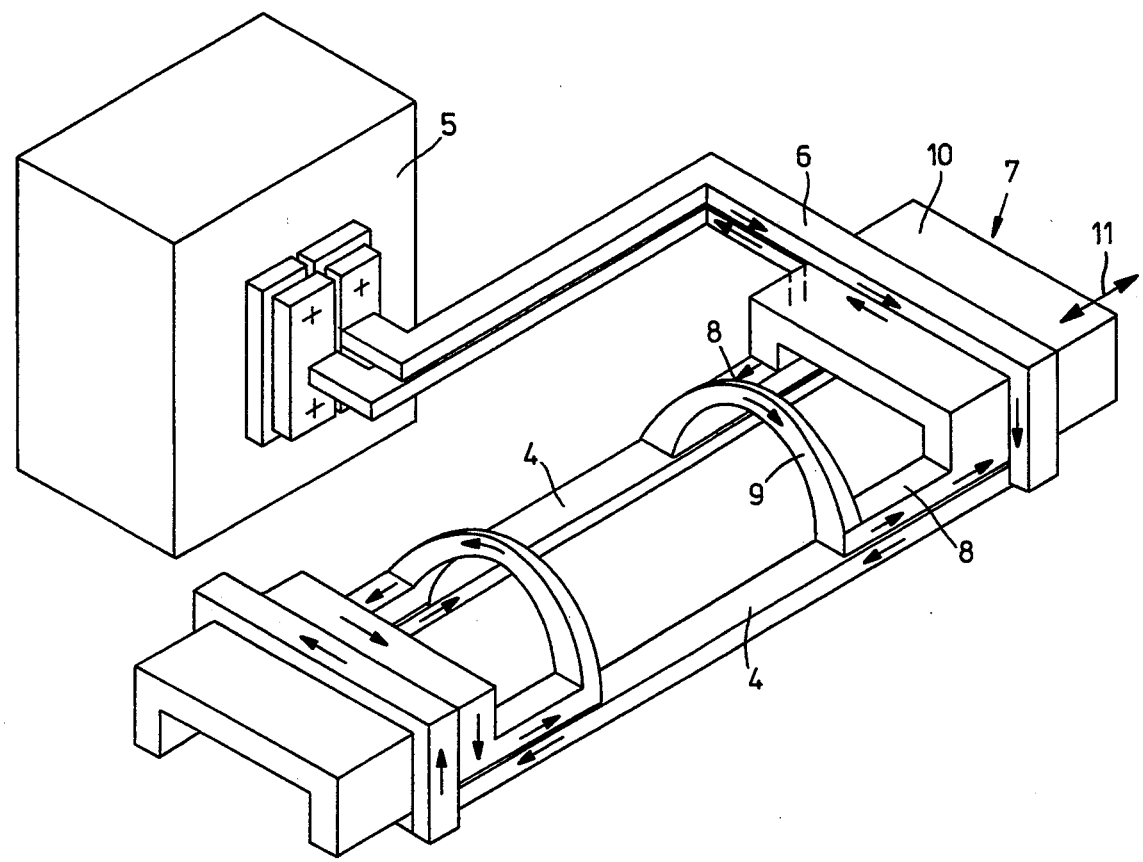
FIG. 2 is a perspective view of a detail thereof (without workpiece)

As shown most clearly in FIG. 2, each auxiliary inductor comprises two parallel conductor portions 8 which extend at a distance parallel with the main heating conductors 4 and are inductively coupled thereto, either air or an insulator being disposed between the main heating conductors 4 and the conductor portions 8. Due to the nature of the coupling of the auxiliary inductor, current flows in the main heating conductors 4 and the conductor portions 8 in opposite directions, as indicated by arrows in FIG. 2. At their ends closest to the workpiece 2 the conductor portions 8 are conductively interconnected via a bridge-shaped conductor branch 9 adapted to the shape of the workpiece. At the opposite axial end, the ends of the conductor portions 8 are connected by a tunnel-shaped return conductor 10 which is disposed beneath the bridge-shaped branch 6 connecting the main heating conductors 4 and is inductively coupled to said branch. The tunnel-shaped return conductor 10 is so coupled to the bridge-shaped branch 6 that the latter induces an oppositely directed current in said tunnel-shaped return conductor 10. However, this takes place concentratedly in the zone lying beneath the bridge-shaped branch 6, while the adjoining zones of the tunnel-shaped return conductor 10 are substantially currentless.

In dependence on the required operative length of the inductor, the auxiliary inductors 7 are displaced axially in relation to the main inductor with the main heating conductors 4 in the direction of arrow 11. The displacement is performed by a displacing mechanism disposed on the machine in which the heated workpiece 2 is rotatably clamped. The mechanism mainly comprises a rack 13 which is rotatably driven by a motor 12 and is connected to a slider block 15 of electrically non-conductive material guided axially along a guide 14 and mechanically connected to the auxiliary inductor 7, which it entrains during axial displacement.

In another embodiment of the invention (FIGS. 3 and 4) the main heating conductors 4 are equipped with L-shaped magnet plates 4a or 4b. The grouped magnet plates 4a, 4b are mainly intended to keep the magnetic field of the conductor 4 away from the supporting roller arrangement 3 and to avoid any disturbance of the magnetic field.

We claim:

1. An inductor having two parallel main heating conductors which are interconnected at one of their ends via a bridge-shaped branch and are connected at their other end to a transformer, the connections also forming a bridge-shaped conductor branch, characterized in that disposed at least at one end of the parallel main heating conductors (4) is a separate auxiliary inductor (7) which is mounted displaceably in relation thereto and has two auxiliary conductor portions (8) parallel with the main heating conductors (4) and inductively coupled only thereto which are collectively interconnected at one of their axial ends via a bridge-shaped conductor branch (9) determining the end of the heating zone and at the other end via a tunnel-shaped return conductor (10) which over the whole displacement length is disposed beneath the bridge-shaped branch (6) of the main heating conductors (4) and is inductively coupled thereto.

2. An inductor according to claim 1, characterized in that the main heating conductors (4) are equipped with L-shaped magnetic plates (4a, 4b).

* * * * *